Patented Sept. 17, 1935

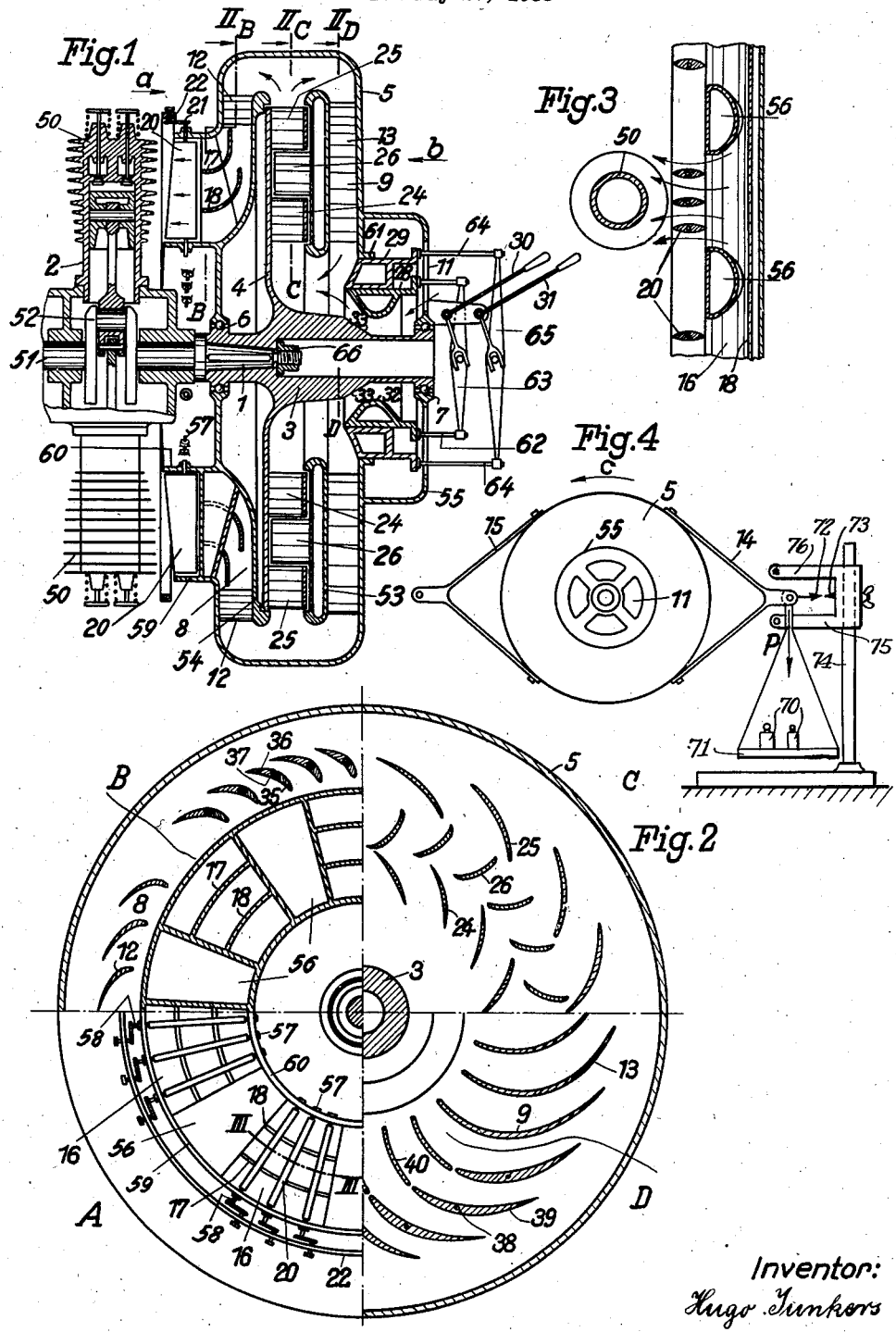

2,014,684

UNITED STATES PATENT OFFICE 2,014,684

APPARATUS FOR MEASURING THE PERFORMANCE OF ENGINES

Hugo Junkers, Dessau, Germany, assignor to the firm Junkers Motorenbau, G. m. b. H., Dessau, Germany Application May 27, 1933, Serial No. 673,177
In Germany June 15, 1932

11 Claims. (Cl. 265—24)

My invention relates to an apparatus for measuring the performance of engines which is particularly suitable for high-speed engines, such as aircraft engines.

Heretofore difficulties were encountered when measuring the performance of such engines without removing them from the aircraft on which they are mounted. The testing of air-cooled engines involves a particular difficulty inasmuch as the relative wind by which such engines are cooled in operation, is not available on the test bed so that it becomes necessary to produce artificially an efficient flow of air for cooling the engine.

The means which were hitherto employed for measuring the performance of engines are:

1. Hydraulic brakes in which an impeller having resistance members rotates in a casing which is wholly or partly filled with water and is also equipped with resistance members;
2. Brake blades, i. e. rotating arms having air-resistance surfaces;
3. Calibrated propellers;
4. Blowers.

All these means are not altogether satisfactory.

Hydraulic brakes are so heavy that they cannot be placed directly on the shaft of the engine instead of the propeller so that the engine must be removed and coupled with the brake on a test bed.

Brake blades suffer under the same difficulty as hydraulic brakes because the engine must be removed and supported on the test bed in bearings in which it is mounted to oscillate. The power consumption of the blades may be varied by adjusting the blades while the engine is running but this requires extremely complicated mechanism so that it is preferred to put up with the inconvenience of stopping the engine when the blades require re-setting.

For air-cooled engines both the hydraulic brakes and the brake blades require extra equipment for producing a flow of air, and for the brake blades this involves the further drawback that the flow of the cooling air exerts forces on the engine in its oscillating bearings which may interfere with the accuracy of the measurements.

Calibrated propellers do not require a test bed but are still not satisfactory. Calibration errors invariably influence the result; the influence of the wind cannot always be eliminated; the results require correction regarding the density of the air; the power consumed by the propeller cannot be varied independently from its speed and a cooling blower is required under certain conditions, as the propeller stream acting on the engine is normally less intense than the relative wind.

Blowers, like hydraulic brakes, are very large and heavy due to improper guiding of the air and cannot be placed on the engine shaft instead of the propeller or they require extra means for cooling the engine.

It is an object of my invention to provide an apparatus in which the aforesaid drawbacks are eliminated, and which is operated with air under atmospheric pressure which is further adapted to be regulated easily with respect to its power consumption and adapted to be placed on the engine shaft instead of the propeller so that the engine need not be removed from the aircraft, while the torque is measured directly and exactly; which dispenses with extra equipment for producing a flow of cooling air, and is not subjected to the detrimental influence exerted on the result by the air flow.

To this end I provide an impeller which may be of the single-stage or multiple-stage type, or a set of impellers arranged in parallel or in series. The impeller is rotated by the engine on whose shaft it may be secured, and is equipped with a casing which is mounted to turn freely with respect to the impeller but is held against rotation with respect to the impeller, and provided with means for discharging the air delivered by the impeller in parallel relation to the axis of the impeller. The delivered air exerts a torque on the casing by friction and by pressure exerted on vanes in the casing, and this torque is equalized by the means which hold the casing against rotation by exerting an equal but opposite torque.

In the drawing affixed to this specification and forming part thereof an apparatus embodying my invention is illustrated diagrammatically by way of example.

In the drawing

Fig. 1 is an axial section,

Fig. 2 is subdivided into four quadrants, of which quadrant A is an end elevation of the casing, viewed in the direction of the arrow "a" in Fig. 1, while quadrants B, C and D are sections on the lines IIB, IIC and IID in Fig. 1, respectively, Fig. 3 is a flattened out section on the circular line III—III in Fig. 2, and Fig. 4 is a diagrammatic end elevation of the apparatus drawn to a smaller scale and viewed in the direction of arrow "b" in Fig. 1.

Referring to the drawing, 2 is a star engine with one of its cylinders 50 shown in axial section. Its shaft 51 with crank throw 52 is equipped with a tapered extension 1 on which the boss 3 of an impeller 4 with two concentric sets of vanes 24 and 25 is keyed and fixed by the nut 66 instead of the propeller. A casing 5 is mounted to turn freely on the boss 2 in bearings 6 and 7 which are preferably antifriction bearings, as shown. The casing has two parallel transverse partitions 53 and 54, and a set of vanes 26 is provided on the partition 53 for cooperation with the sets 24 and 25 of the impeller 4.

The casing 5 has an inlet pipe 55 with four inlet openings 11 in its front wall through which air is admitted to the vanes 24 of the impeller 4 through a central hole 56 in the partition 53.

Two outlets are presented to the air which is delivered by the impeller 4 through its vanes 25. The first outlet is a discharge passage 8 which is defined by the partition 54 and the rear end wall of the casing. The second outlet is a return-flow passage 9 which is defined by the partition 53 and the front end wall of the casing. The flow in the two outlets is indicated by the arrows in Fig. 1. Guiding vanes 12 are provided in the discharge passage 8 and guiding vanes 13 are provided in the return-flow passage 9. The vanes 12 and 13 compel the air which is delivered tangentially at the perimeter of the impeller 4, into an approximately radial path. This change of direction results in a reaction tending to turn the casing 5 in the direction of the arrow c in Fig. 4. The reaction torque is balanced by forces P which engage levers 14 and 15 on the casing 5 and may be exerted by weights, springs or any other suitable means. In Fig. 4 such measuring means are indicated by way of example, the weights 70 placed on the scale pan 71 suspended from lever arm 14 exerting on this arm the force P which counterbalances the reaction torque, a pointer 72 on the lever 14 and a mark 73 on the support 74 serving to render the counter-balancing visible. Undue angular or rotative movements of the casing are prevented by the stop arms 75, 76 which are vertically adjustable on the standard 74. The torque which the forces P exert for balancing the reaction torque of the casing, is a measure for the performance of the engine 2.

The air partly circulates in the return-flow passage 9 and partly is discharged through openings 16, Figs. 2 and 3, in the rear end wall of the casing 1. The discharged air is made up by the fresh air drawn into the apparatus through the openings 11. In order to utilize the flow of discharged air for cooling the engine, the discharge openings 16 are arranged in line with the cylinders 50 of the engine 2 if the engine is air-cooled and its cylinders have cooling ribs, as shown. If the engine is equipped with radiators for cooling water, the discharged air flows about the radiators (not shown) which are normally arranged at the front end of the engine. Whatever may be the cooling system, it will by the means described be operated by a strong flow of air, as in flight. Obviously, the area, shape and arrangement of the discharge openings 16 must be adapted to the arrangement of the cylinders which may be arranged star-fashion as shown, or in rows in parallel to the axis of the crank shaft and to the position of the parts of the engine or radiators toward which the flow of discharged air is directed. In the case of star engines, as shown, a single annular discharge opening (not shown) may be provided instead of the individual openings 16.

Guiding vanes 17 and 18 are arranged in the discharge passage 8 and supported by hollow ribs 56 at the sides of the openings 16. The guiding vanes 17 and 18 are so arranged that they deflect the air in the passage 8 to which air, as mentioned, radial direction has been imparted by the guiding vanes 12, into a direction substantially parallel to the axis of the impeller 4 in which direction the air is discharged from the openings 16. By providing two systems of vanes, the distance of the impeller 4 from the engine 2 is reduced to a minimum. The final discharge of the air in axial direction also prevents reaction of the flow of discharged air on the casing which might set up a torque on the casing and lead to wrong results. In order to correct small irregularities in the discharge of the air, guiding vanes 20 are arranged in every opening 16 and mounted to turn on pivots 57 and 58 in concentric flanges 59 and 60 of the casing 1. Cranks 21 are secured on the pivots 58, and 22 is a ring for turning the cranks in unison.

The impeller 4 is of the two-stage type in the example illustrated, having the two sets of vanes 25 and 24, with the fixed vanes 24 on the partition 53 between them.

The air inflow to the impeller is regulated by two sleeve valves 28 and 29. The outer valve 29 is mounted to slide in a spigot 61 of the inlet pipe 55, and the inner valve 28 is mounted to slide in the outer valve 29. The inner valve 28 has an inwardly projecting portion 32 which cooperates with a taper 33 on the impeller boss 3. Rods 62 are secured to the valve 28 and project from the pipe 55, 63 is a cross bar connecting the rods, and 30 is a bellcrank lever for moving the valve 28. Similar means including rods 64, a cross bar 65 and a bellcrank lever 31 are provided for moving the outer valve 29. The inner valve 28 regulates the free sectional area of the inlet and the outer valve regulates the free sectional area of the return-flow passage 9.

The sleeves or slide valves 28 and 29 may be replaced by adjustable vanes. By way of example, the vanes 13 in the return flow passage 9 may be combined with, or replaced by, vanes 39 oscillating about pivots 38 with or without fixed vanes 40, as shown in Fig. 2, quadrant D. The vanes 12 in the discharge passage 8 may also be combined with, or replaced by, vanes 36 oscillating about pivots 37, with or without fixed vanes 35, quadrant B in Fig. 2. By adjusting the vanes 36 and 39 in the discharge and return-flow passages the delivery pressure at the perimeter of the impeller 4 may be increased in order to amplify the measuring range of the apparatus.

The measuring range may also be amplified by merely increasing the volume of air circulating in the return-flow passage 9. If the air discharged from openings 16 is not required for cooling the engine, its volume may be small as compared with that of the air circulating in the return-flow passage 9. In this case, the discharged air serves only for abducting the heat produced in the apparatus and prevents overheating of the apparatus. If the test is of short duration all the air which is drawn into the impeller may be circulated and no air discharged.

By varying the volume of air flowing through the impeller, and/or varying the delivery pressure of the impeller, the power input of the apparatus and its measuring range are varied. The amount of air discharged through openings 16 is varied by throttling the inlet to the impeller through the medium of valve 28, and the amount of circulating air is varied by throttling the return-flow passage 9 through the medium of valve 29. If it is desired to vary the delivery pressure, the discharge passage 8 is throttled by vanes 36, and, if a return-flow passage 9 is provided, this is also throttled.

The apparatus is small in axial as well as in radial direction and is so light that it can be placed on the crank shaft of the engine instead of the propeller without overstressing the crank shaft.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In an apparatus for measuring the performance of engines and more especially aircraft engines in combination, an air conveying device arranged to be fixed to and to be supported by the engine shaft, a casing surrounding and supported by said device for independent rotation relative to it, vanes arranged in said casing to be acted upon by the air conveyed by said device, means for resisting rotation of said casing, means for measuring this resistance, and means including two systems of guide vanes associated with said casing for guiding the air conveyed by said device in contact with said engine to cool same.

2. In an apparatus for measuring the performance of engines and more especially aircraft engines in combination, an air conveying device arranged to be fixed to and to be supported by the engine shaft, a casing surrounding and supported by said device for independent rotation relative to it, vanes arranged in said casing to be acted upon by the air conveyed by said device, means for resisting rotation of said casing, means for measuring this resistance, and means including two systems of guide vanes associated with said casing for guiding the air conveyed by said device first substantially at right angles and thereafter parallel to the axis and in contact with said engine to cool same.

3. In an apparatus for measuring the performance of engines and more especially aircraft engines in combination, an air conveying device arranged to be fixed to and to be supported by the engine shaft, a casing surrounding and supported by said device for independent rotation relative to it, means for admitting variable quantities of air into said casing, vanes arranged in said casing to be acted upon by the air conveyed by said device, means for resisting rotation of said casing, means for measuring this resistance, and means including two systems of guide vanes associated with said casing for guiding the air conveyed by said device first substantially at right angles and thereafter parallel to the axis and in contact with said engine to cool same.

4. In an apparatus for measuring the performance of engines and more especially aircraft engines in combination, an air conveying device arranged to be fixed to and to be supported by the engine shaft, a casing surrounding and supported by said device for independent rotation relative to it, vanes arranged in said casing to be acted upon by the air conveyed by said device, means for resisting rotation of said casing, means for measuring this resistance, and means including two systems of guide vanes associated with said casing for discharging the air conveyed by said device first substantially at right angles and thereafter parallel to the axis and in contact with said engine in parallel relation to the axis of rotation.

5. In an apparatus for measuring the performance of engines in combination, an air conveying device arranged to be fixed to the engine shaft, a casing surrounding and arranged for rotation about said device, vanes arranged in said casing to be acted upon by the air conveyed by said device, means for resisting rotation of said casing, means for measuring this resistance, means associated with said casing for discharging air conveyed by said device in contact with said engine in parallel relation to the axis of rotation, and vanes arranged for oscillation about radial axes for directing the outflow of the discharged air from said casing.

6. In an apparatus for measuring the performance of engines in combination, an air conveying device, arranged to be fixed to the engine shaft, a casing surrounding and arranged for rotation about said device, vanes arranged in said casing to be acted upon by the air conveyed by said device, means for resisting rotation of said casing, means for measuring this resistance, means associated with said casing for discharging air conveyed by said device in contact with said engine in parallel relation to the axis of rotation, vanes arranged for oscillation about radial axes for directing the outflow of the discharged air from said casing, and means for turning said oscillatable vanes about their axes.

7. In an apparatus for measuring the performance of engines and more especially aircraft engines in combination, an air conveying device arranged to be fixed to and to be supported by the engine shaft, a casing surrounding and supported by said device for independent rotation relative to it, said device and said casing defining a return flow passage extending from the perimeter of said device to its centre, vanes arranged in said casing to be acted upon by the air conveyed by said device, means for resisting rotation of said casing, means for measuring this resistance, and means associated with said casing for guiding air conveyed by said device in contact with said engine to cool same.

8. In an apparatus for measuring the performance of engines and more especially aircraft engines in combination, an air conveying device arranged to be fixed to and to be supported by the engine shaft, a casing surrounding and supported by said device for independent rotation relative to it, said device and said casing defining a return flow passage extending from the perimeter of said device to its centre, means for regulating the flow of the air in said passage, vanes arranged in said casing to be acted upon by the air conveyed by said device, means for resisting rotation of said casing, means for measuring this resistance, and means associated with said casing for guiding air conveyed by said device in contact with said engine to cool same.

9. In an apparatus for measuring the performance of engines and more especially aircraft engines in combination, a multi-stage air conveying device arranged to be fixed to and to be supported by the engine shaft, a casing surrounding and supported by said device for independent rotation relative to it, vanes arranged in said casing to be acted upon by the air conveyed by said device, means for resisting rotation of said casing, means for measuring this resistance, and means including two systems of guide vanes associated with said casing for guiding the air conveyed by said device first substantially at right angles and thereafter parallel to the axis and in contact with said engine to cool same.

10. In an apparatus for measuring the performance of engines and more especially aircraft engines in combination, an air conveying device arranged to be fixed to and to be supported by the engine shaft, a casing surrounding and supported by said device for independent rotation relative to it, said device and said casing defining on the side of said device averted from the air outlet, a return flow passage extending in said casing from the perimeter of said device to its centre, vanes arranged in said casing to be acted upon by the air conveyed by said device, means for resisting rotation of said casing, means for measuring this resistance, and means including two systems of guide vanes associated with said casing for guiding the air conveyed by said device first substantially at right angles and thereafter parallel to the axis and in contact with said engine to cool same.

11. In an apparatus for measuring the performance of engines in combination, a multi-stage air conveying device arranged to be fixed to the engine shaft, a casing surrounding and arranged for rotation about said device, vanes arranged in said casing to be acted upon by the air conveyed by said device, means for resisting rotation of said casing, means for measuring this resistance, means associated with said casing for guiding air conveyed by said device in contact with said engine to cool the same, and means for throttling the air thus conveyed, said throttling means being arranged in the air duct formed, in the direction of air conveyance, behind said conveying device.

HUGO JUNKERS.